United States Patent [19]

Erland

[11] Patent Number: 4,548,470

[45] Date of Patent: Oct. 22, 1985

[54] PROJECTION SCREEN

[75] Inventor: Jonathan Erland, Los Angeles, Calif.

[73] Assignee: Apogee, Inc., Van Nuys, Calif.

[21] Appl. No.: 618,999

[22] Filed: Jun. 11, 1984

[51] Int. Cl.$^4$ ............................................. G03B 21/60
[52] U.S. Cl. ..................................................... 350/129
[58] Field of Search ........................... 350/129; 428/44

[56] References Cited

U.S. PATENT DOCUMENTS

| 3,469,837 | 9/1969 | Heilig ............................. | 350/129 X |
| 4,241,980 | 12/1980 | Mihalakis et al. ................. | 350/129 |
| 4,297,001 | 10/1981 | Antes et al. ..................... | 350/129 |
| 4,329,019 | 5/1982 | Okoshi et al. .................... | 350/129 |

FOREIGN PATENT DOCUMENTS 588688  10/1924  France ................................. 350/129

Primary Examiner—Richard A. Wintercorn
Attorney, Agent, or Firm—Blakely, Sokoloff, Taylor & Zafman

[57] ABSTRACT

An improved projection screen is provided having particular application for use in front projection composite photography. A substrate screen backing is provided onto which a plurality of tiles of screen material is attached. Each of the tiles of screen material is formed in the shape of a regular, concave hexagon whose connective line segment edges describe a concave arc from a first segment point "A" to a midpoint "M", wherein the concave arc has a radius of curvature R equal to the distance between segment point A and the midpoint M. A convex arc is described having a radius R from the midpoint M to a second segment point "B". Each of the tiles of screen material are attached to the substrate backing in a regular periodic fashion, such that the backing is tessellated with tiles of screen material. In the present embodiment, the edges of each tile of screen material are overlapped with adjacent tiles of material, in order to form a homogenous projection screen.

11 Claims, 9 Drawing Figures

PROJECTION SCREEN

BACKGROUND OF THE INVENTION

1. Field of the Invention

The present invention relates to the field of projection screens, and more particularly, to projection screens utilized in front projection composite photography.

2. Art Background

Composite photography is the art of combining two or more separately photographed subjects into one scene. In motion picture production, a classic example of this technique is the rendition of a scene comprising an automobile interior inhabited by actors with an exterior street scene visible through the automobile windows. Other examples of composite photography include the placement of fictional objects, such as futuristic spacecraft or extraterrestrial landscapes, in a scene with live actors or full scale props.

Front projection is a method of composite photography which was originally developed through the work of Walter Thorner around 1932, as part of an effort to overcome the shortcomings inherent in rear projection processes. In a typical front projection system, a camera and projector are disposed at substantially 90° with respect to one another, and a partially silvered mirror is located at an approximate 45° angle relative to both the camera and projector (see FIG. 1). The projector projects an image onto a background screen disposed in back of a foreground object. The camera then photographs both the projected background scene as well as the foreground object on one or more frames of film.

It was soon realized that a major requirement of the front projection screen was to return the projected image back to the camera lens as efficiently and as uniformly as possible. The optical path of the projected image must be substantially coincident with the path of the return images seen and recorded by the camera. In early front projection systems, the background scene failed to equal the foreground scene in image quality. This degradation of the projected image threatened to destroy the illusion created by the front projection process.

In 1951, the Motion Picture Research Council, Inc. issued Report No. 58.334-D by Herbert Meyer, Chief chemist, entitled: "Front Projection Process Photography with Scotchlite". This report described the optical qualities of a material referred to as "Scotchlite" and its application to photographic front projection. This reflective material had been developed by Philip Palmquist and manufactured by the Minnesota Mining and Manufacturing Company ("3M"). Scotchlite material is the subject of two issued U.S. patents: U.S. Pat. No. 2,294,930, dated Sept. 8, 1942 and U.S. Pat. No. 2,379,741, dated July 3, 1945. Scotchlite was originally intended for traffic signs and the like and included minute glass beads, each of which acted like a concave mirror, reflecting back, not the whole projected image, but rather, a small portion of the image.

The 1951 report by Herbert Meyer delineated in a very methodical fashion the various ways in which Scotchlite might be expected to have utility in motion picture production. Meyer examined the effects of camera movements by dollying, panning, tilting, etc., and concluded that, while movements that called for the camera to pivot about the nodal point of its lens, as in panning and tilting, were permissible, the system should otherwise be regarded as a stationary camera system. In his conclusion, Meyer stated that "[t]he fabricating of a large size screen from Scotchlite materials will introduce the problem of seams, which may require special attention".

In the intervening years, it has been found that Scotchlite seams have presented a significant problem in sophisticated front projection composite photography. The manufacturer of Scotchlite, initially advised that it would be sufficient to lay the material out in strips horizontally, and as long as necessary, in a shingle fashion, with each succeeding layer overlapping the previous one. Another method described "butt joints" with a half inch wide Scotchlite strip covering the joint. However, it was soon apparent that the problem of seams in front projection systems utilizing a Scotchlite screen was much more complex than merely disguising the seam itself. As a result of the rather critical nature of the optics involved, and the vagaries of the mass production process, there were preceptible differences in the Scotchlite material, even within the same roll. The material had not only to be joined together, but first broken up into relatively small pieces and "shuffled" in order to reassemble it as a mosaic and thereby produce a homogenous whole onto which an image could be projected.

Various methods were employed to accomplish the homogenizing of a Scotchlite screen. Cutting the material into squares, while economical, left a checkerboard pattern that was readily discerned by an audiences' eyes used to identifying straight lines and right angles. Tearing the Scotchlite material into irregular patches and placing it on a screen was found to be an improvement, but highly labor intensive and wasteful of material. Some improvement was obtained by cutting the Scotchlite material into hexagons, thus reducing the number of conjoint segments and limiting the length of a single edge. However, even through the use of hexagons, there were still straight lines evident, and a solution was required that would eliminate the straight line phenomena without incurring a waste of material.

As will be described, the present invention overcomes the historic problems associated with utilizing Scotchlite or other high gain screen materials in a front projection system. The present invention provides a screen, having particular utility in front projection composite photographic systems, comprised of a plurality of uniquely formed complementary sections of high gain screen material. As will be appreciated from the discussion which follows, although the present invention is particularly suited for use with Scotchlite type materials, it may be used in numerous applications which require a homogenous projection screen.

SUMMARY OF THE INVENTION

An improved projection screen is provided having particular application for use in front projection composite photography. A substrate screen backing is provided onto which a plurality of tiles of screen material is attached. Each of the tiles of screen material is formed in the shape of a regular, concave hexagon whose connective line segment edges describe a concave arc from a first segment point "A" to a midpoint "M", wherein the concave arc has a radius of curvature R equal to the distance between segment point A and the midpoint M. A convex arc is described having a radius R from the midpoint M to a second segment point "B". Each of the tiles of screen material are attached to the substrate backing in a regular periodic fashion, such that the backing is tessellated with tiles of screen material. In the present embodiment, the edges of each tile of screen material are overlapped with adjacent tiles of material, in order to form a homogenous projection screen. The projection screen of the present invention permits front projection composite photograhy such that the edges of each tile of screen material are not readily descernable by a viewer observing a scene on the projection screen. In the preferred embodiment, each tile of screen material is comprised of "Scotchlite" manufactured by the 3M Co.

DETAILED DESCRIPTION OF THE INVENTION

An improved projection screen is disclosed having particular application for use in front projection composite photography. In the following description for purposes of explanation, specific materials, shapes, optical structures, values and configurations are set forth in order to provide a thorough understanding of the present invention. However, it will be apparent to one skilled in the art that the present invention may be practiced without these specific details. In other instances, well known optical elements and systems are shown in diagrammatical form in order not to obscure the present invention unnecessarily.

Figure 1:
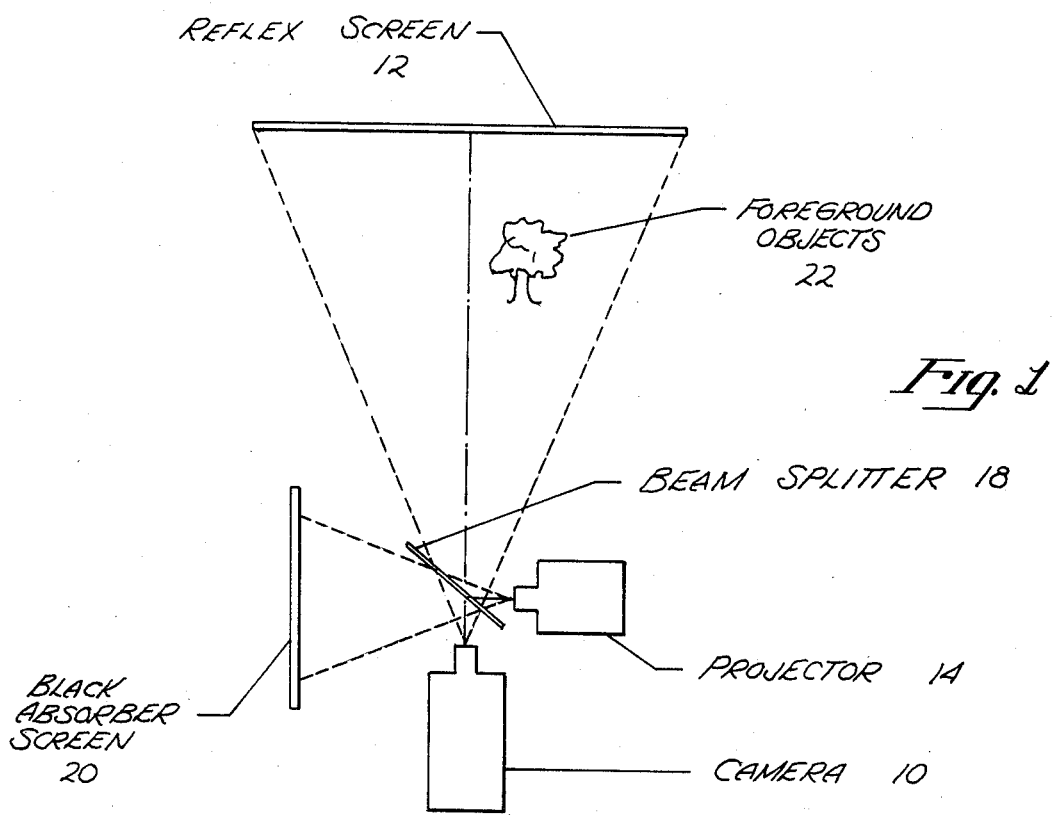
FIG. 1 is a diagrammatical representation of a typical front projection system.

Referring now to FIG. 1, a traditional front projection system is illustrated. A camera 10 is disposed in optical alignment with a reflex screen 12. A projector 14 is positioned at substantially 90° relative to camera 10. A partially silvered mirror ("beam splitter") 18 is disposed in optical alignment with, and at a 45° angle relative to, camera 10 and projector 14, such that images projected by projector 14 are reflected onto reflex screen 12 and may be photographically recorded by camera 10. In practice, mirror 18 is partially silvered such that a desired percentage of the light from projector 14 is reflected onto the reflex screen 12. Light which is not reflected by mirror 18 is passed onto a black absorber screen 20 (commonly referred to as a "light trap"), so as not to interfere with the images recorded by camera 10. As illustrated, a foreground object 22 is disposed between camera 10 and reflex screen 12. The resulting image, as viewed by camera 10, is a composite of the projected image onto reflex screen 12 in conjunction with the image of the foreground object 22. As shown, light reflected from reflex screen 12 and foreground object 22 is passed through beam splitter 18 that the reflected light is recorded by camera 10. A composite scene is thereby generated in which the viewer observes the projected image from projector 14 and the foreground object 22 as being coincident in time and space.

As previously discussed, typical reflex screens used for front projection composite photography are comprised of a "Scotchlite" material as described in U.S. Pat. Nos. 2,294,930 and 2,379,741. Scotchlite material includes numerous minute glass spheres embedded in a reflective binder which is disposed on a backing material (e.g., vinyl). In constructing reflex screen 12, a significant problem in the prior art has been in the elimination of perceived seams in the screen by a viewer. The visibility of seams or lines in the Scotchlite material comprising reflex screen 12 may significantly degrade the believability of a subsequent composite image to a viewing audience.

The improved projection screen of the present invention is comprised of a plurality of discrete tiles of high grain screen material formed and arranged in such a manner so as to significantly minimize the possibility of a viewer perceiving the edges of each tile, and thereby the reflex screen 12, in a composite picture. Although in the presently preferred embodiment, each tile is comprised of a Scotchlite material, it will be appreciated by one skilled in the art that the present invention may be used in conjunction with a variety of high gain sheeting or screen materials. For example, other screen materials which may be used by the present invention include those described in U.S. Pat. Nos. 3,702,213; 3,810,804; 3,919,031; 3,935,359; 3,963,309; 4,068,922; and 4,354,738.

Figure 2:
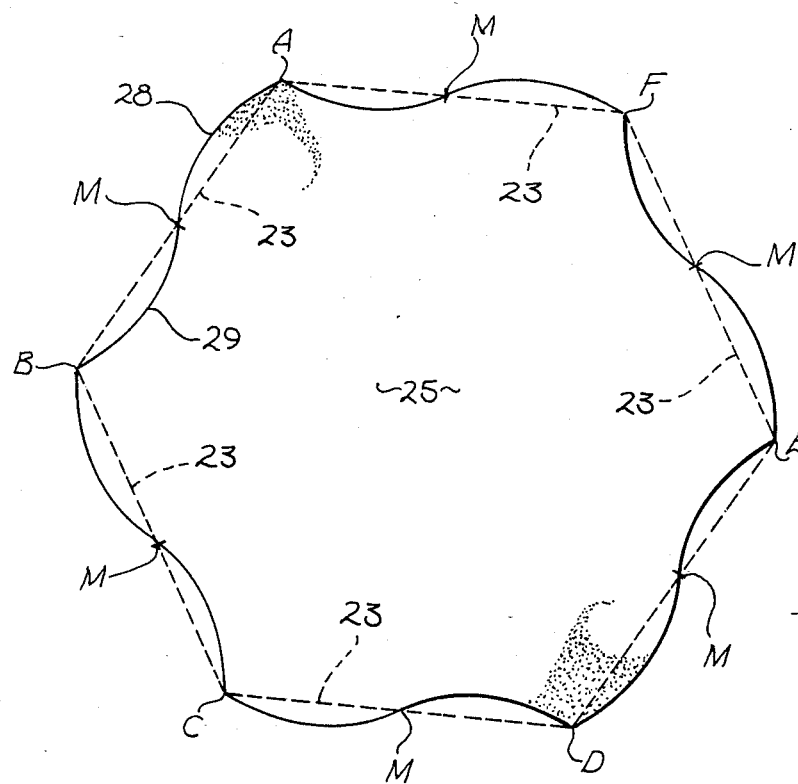
FIG. 2 illustrates the shape of each tile of screen material which forms the present invention's projection screen.
Figure 3:
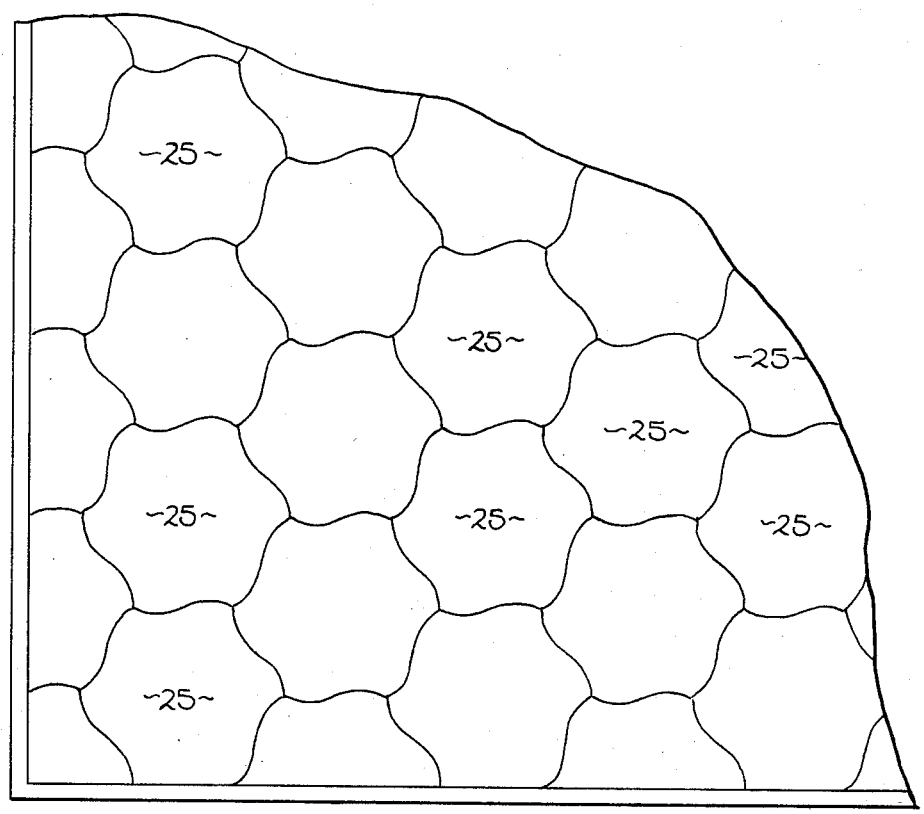
FIG. 3 illustrates the manner in which each tile of screen material is attached to a screen substrate in order to form a homogeneous projection screen.

The screen of the present invention is comprised of a plurality of tiles 25, the shape of which is illustrated in FIG. 2. The shape of each tile 25 may initially be approximated by a hexagon (as indicated by phantom lines in FIG. 2). The general hexagon shape is delineated by segment points, such as "A" and "B" illustrated in FIG. 2. As previously discussed, in order to minimize the possibility of a viewer observing the plurality of tiles comprising reflex screen 12, no straight edges may be utilized in defining the shape of each tile 25. Accordingly, it has been found that the use of tiles formed in the simple shape of a hexagon does not provide a satisfactory screen for composite front projection photography.

As illustrated in FIG. 2 a point "M" may be defined as the midpoint of each line segment 23 between point A and point B. By deforming line segment 23 in a generally sinusoidal shape through points A and B, a concave arc section 28 may be defined between point A and point M. Similarly, a convex section 29 may be defined between point B and point M, as illustrated in the drawings. By properly deforming line segments 23 between each segment point (e.g., points "C" and "D", etc.) of tile 25, tile 25 takes on the shape as illustrated in FIG. 2. Although line segment 23 is shown in FIG. 2 as being deformed into one complete sin wave function between each segment point, it will be appreciated that each line segment 23 may be deformed into a plurality of sin waves passing through the segment and mid points.

Figure 4:
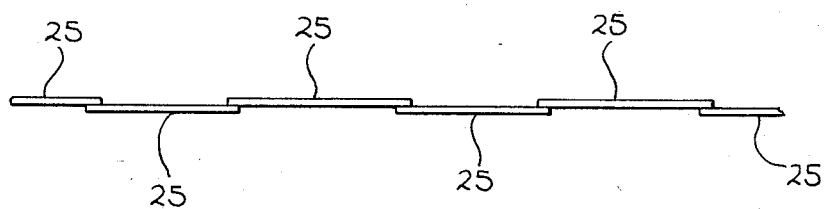
FIG. 4 illustrates the manner in which each tile of screen material is overlapped along its edges with adjacent tiles of material.
Figure 5A:
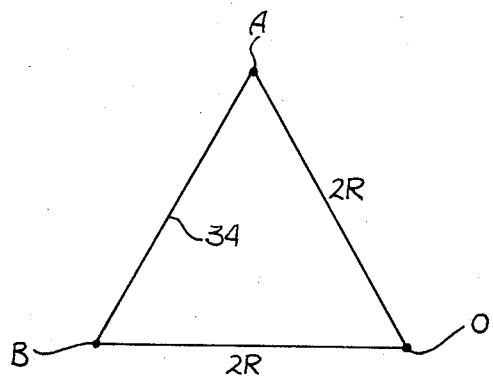
FIGS. 5(a) through (d) illustrate a geometric construction utilized by the present invention in order to define the shape of each tile.
Figure 5B:
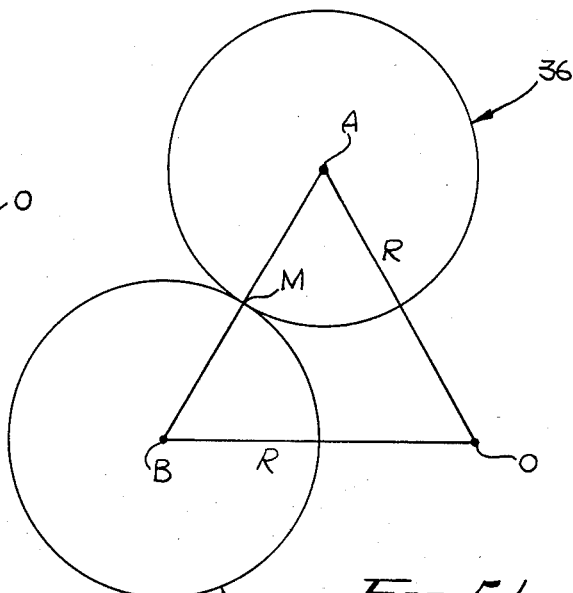
Figure 5C:
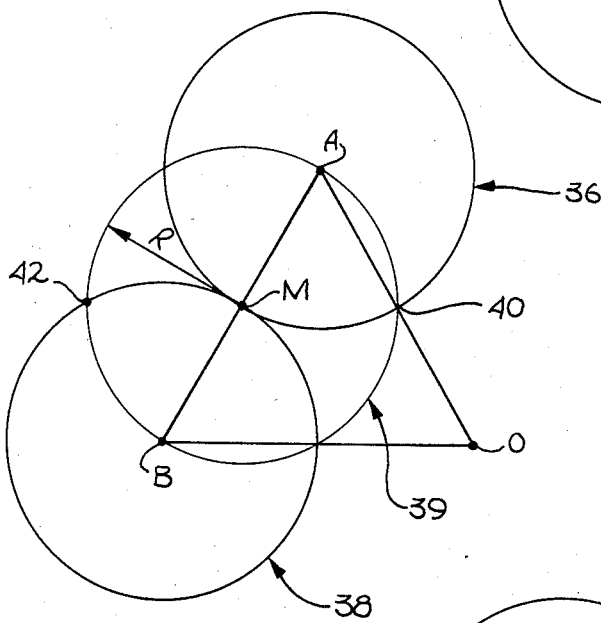
Figure 5D:
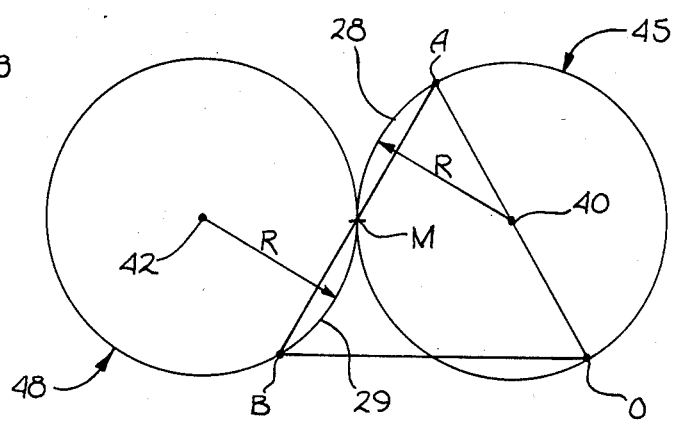

In assembling reflex screen 12, a plurality of tiles 25 are adhesively tessellated onto a substrate backing comprising screen 12 in a regular, periodic fashion. The substrate backing may be rigid or flexible, and may vary depending upon a particular application in which screen 12 is used. In the present embodiment, a substrate backing comprising a layered structure of cloth ("DACRON") and mylar has been found satisfactory. As best illustrated in FIG. 4, tiles 25 are applied to the substrate backing of screen 12 such that the edges of each of the tiles conjoin and overlap by approximately ¼ to ½ of an inch. The overlapping of the tiles 25 along the conjoined edges of adjacent tiles further minimizes the visibility of the edges, and results in a homogenous screen background onto which images may be projected for composite photography.

Figure 6:
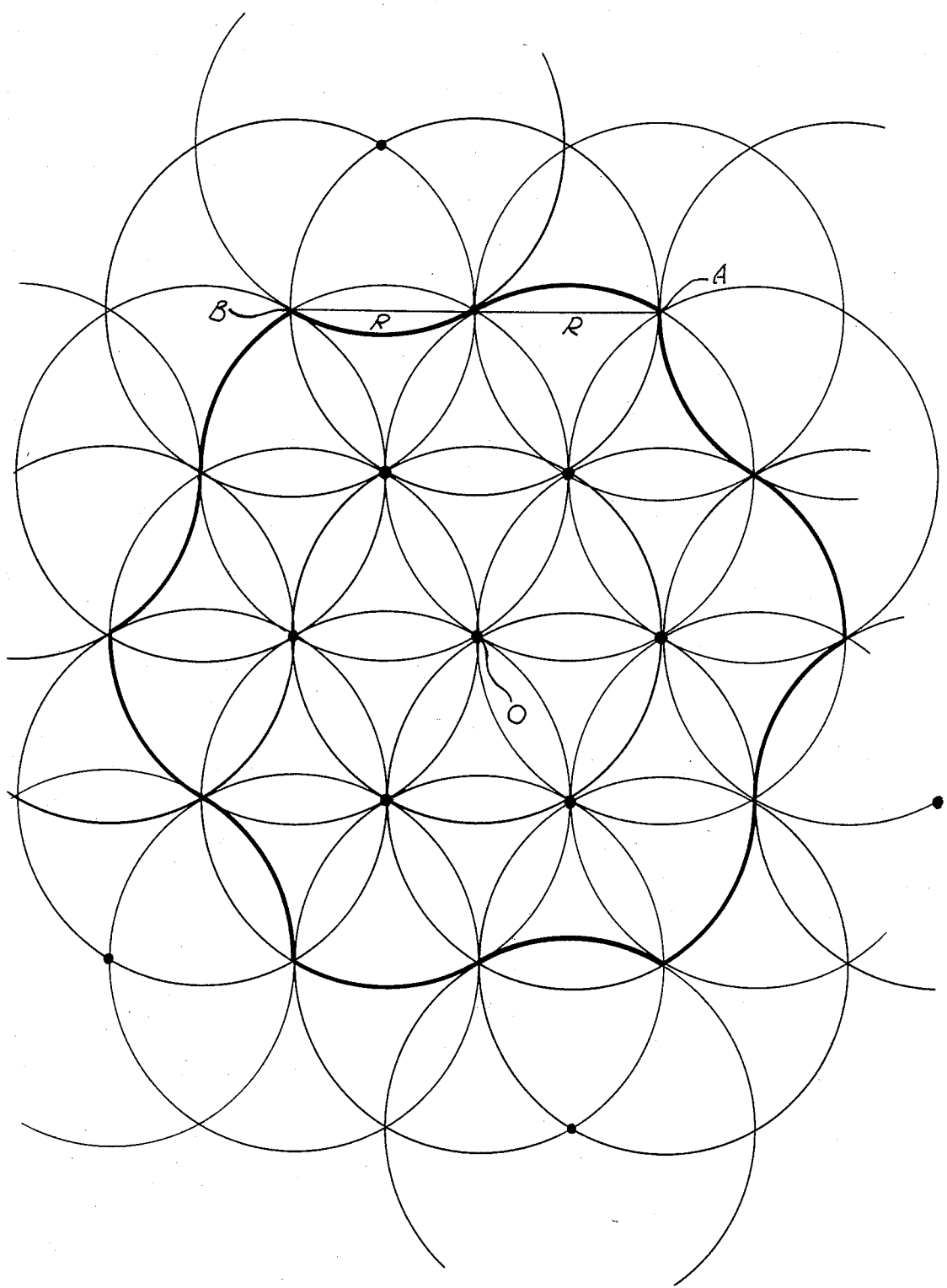
FIG. 6 illustrates a geometric construction defining the entire shape of each screen tile.

In order to further geometrically define the shape of each tile 25, and specifically the shape of each segment between relative points A through F, shown in FIG. 2, the geometric construction illustrated in FIGS. 5 and 6 may be completed. As best shown in FIG. 5, the central point of each tile 25 may be defined as an origin point "O". Segment points A and B lie at a distance 2R from point O, and are connected by line segment 34 which corresponds to line segment 23 in FIG. 2. As shown in FIG. 5(b), midpoint M may be located by circumscribing a circle 36 of radius R about point A, and a circle 38 with a radius R about point B. Point M is defined as that point wherein circles 36 and 38 contact one another, and is the midpoint of the line segment 34. As shown in FIG. 5(c), intermediate points 40 and 42 may be defined by a circle 39 circumscribed about point M having a radius R. Points 40 and 42 are defined at the intersection of circle 39 with circles 36 and 38, respectively. Finally, be defining two additional circles 45 and 48 about points 42 and 40, each circle having a radius R, arc sections 28 and 29 are completely defined as those segment passing through midpoint M, and points A and B, respectively. Although the Figures illustrate arc section 28 having a concave form and arc section 29 having a convex form, it will be appreciated by one skilled in the art that the present invention may also be realized by rendering section 28 convex and section 29 concave. As best shown in FIG. 6, the entire shape of each tile 25 may be defined by carrying out the previously described geometric construction of FIG. 5 for each segment 23 defining the tile 25.

It has been found that the present invention's projection screen comprising a plurality of conjoined and overlapped tiles 25 attached to substrate backing provides a homogenous and uniform retro-reflecting surface having particular utility in front projection composite photographic systems. The present invention's unique tile shape overcomes the disadvantages inherent in prior art projection screens, and minimizes the likelihood of a viewer perceiving the descrete tile elements comprising the screen and thereby destroying the illusion created using front projection techniques.

While the present invention has been described with reference to FIGS. 1 through 6, and with emphasis on front projection composite photography, it should be understood that the Figures are for illustration only, and should not be taken as limitations upon the invention. It is contemplated that many changes and modification may be made by one of ordinary skill in the art, to the materials and arrangements of elements disclosed without departing from the spirit and scope of the invention.

I claim:

1. An improved projection screen, comprising:
   a substrate backing;
   a plurality of tiles comprised of a screen material attached to said backing, each of said tiles shaped in the general form of a regular concave hexagon having connective line segments between segment points defining said hexagon, the shape of each of said connective line segments being defined by a sinusoidal function;
   said plurality of tiles being attached to said substrate backing in a regular periodic fashion, such that said backing is tessellated with said tiles;
   whereby the edges of each of said tiles are not readily descerned by a viewer observing a projected image on said screen.

2. The improved projection screen as defined by claim 1 wherein said tiles of screen material are attached to said backing such that edges of each of said tiles overlap edges of adjacent tiles.

3. The improved projection screen as defined by claim 2, wherein said screen material tiles include a layer of retro-reflecting glass spheres which reflect incident light in a relatively narrow cone back toward the source of said light.

4. The improved projection screen as defined by claim 2, wherein said backing comprises a layered structure of cloth and mylar.

5. The improved projection screen as defined by claim 4, wherein said screen is used in conjunction with a front projection system for composite photography.

6. An improved projection screen, comprising:
   a substrate backing;
   a plurality of tiles comprised of a screen material attached to said backing, each of said tiles having the general form of a regular concave hexagon whose connective line segments describe a concave arc from a first segment point to a midpoint "M", said concave arc having its radius of curvature R equal to the distance between said first segment point and said midpoint M, and a convex arc having radius R from said point M to a second segment point;
   said plurality of tiles being attached to said substrate backing in a regular periodic fashion, such that said backing is tessellated with said tiles;
   whereby the edges of each of said tiles are not readily descerned by a viewer observing a projected image on said screen.

7. The improved projection screen as defined by claim 6 wherein said tiles of screen material are attached to said backing such that edges of each of said tiles overlap edges of adjacent tiles.

8. The improved projection screen as defined by claim 7, wherein said screen material tiles include a layer of retro-reflecting glass spheres which reflect incident light in a relatively narrow cone back toward the source of said light.

9. The improved projection screen as defined by claim 8, wherein said backing comprises a layered structure of cloth and mylar.

10. The improved projection screen as defined by claim 9, wherein said screen is used in conjunction with a front projection system for composite photography.

11. An improved projection screen, comprising:
    a substrate backing;
    a plurality of tiles comprised of a screen material attached to said backing, each of said tiles taking the general form of a regular concave hexagon having connective line segments between segment points "A"–"F", each of said connective line segments describing a concave arc from a first segment point to a midpoint "M", said concave arc having its radius of curvature "R" equal to the distance between said first segment point and said midpoint M, and a convex arc having radius R from said midpoint M to a second segment point;

said plurality of tiles being attached to said substrate backing in a regular periodic fashion, such that said backing is tessellated with said tiles;

whereby the edges of each of said tiles are not readily descerned by a viewer observing a projected image on said projection screen.

* * * * *

UNITED STATES PATENT AND TRADEMARK OFFICE
CERTIFICATE OF CORRECTION

PATENT NO. : 4,548,470
DATED : Oct. 22, 1985
INVENTOR(S) : Erland

It is certified that error appears in the above-identified patent and that said Letters Patent is hereby corrected as shown below:

On the Title Page:

(75) Please delete the inventor's name "Jonathan Erland, Los Angeles, Calif." and insert in lieu thereof --Jonathan Erland, Los Angeles and Robert Bealmear, Los Angeles, both of California--.

Signed and Sealed this

Tenth Day of March, 1987

*Attest:*

DONALD J. QUIGG

*Attesting Officer*  *Commissioner of Patents and Trademarks*